US012623631B2

(12) United States Patent 　(10) Patent No.: US 12,623,631 B2
Jain et al. 　(45) Date of Patent: May 12, 2026

(54) ULTRA WIDE BAND (UWB) BASED AUTOMATIC TRUNK ADJUSTMENT

(71) Applicant: Tesla, Inc., Austin, TX (US)

(72) Inventors: Brahmesh Saligrama Dharanendra Jain, San Francisco, CA (US); Austin Shaski, Winnipeg (CA); Bernard Bekker, Palo Alto, CA (US); Pak Heng Lau, San Francisco, CA (US)

(73) Assignee: TESLA, INC., Austin, TX (US)

( * ) Notice: Subject to any disclaimer, the term of this patent is extended or adjusted under 35 U.S.C. 154(b) by 0 days.

(21) Appl. No.: 18/766,446

(22) Filed: Jul. 8, 2024

(65) Prior Publication Data

US 2026/0008433 A1 　Jan. 8, 2026

(51) Int. Cl.
*B60Q 3/30* 　(2017.01)
*B60R 25/01* 　(2013.01)
*B60R 25/24* 　(2013.01)

(52) U.S. Cl.
CPC .............. *B60R 25/245* (2013.01); *B60Q 3/30* (2017.02); *B60R 25/01* (2013.01)

(58) Field of Classification Search
CPC .......... B60R 25/245; B60R 25/01; B60Q 3/30
See application file for complete search history.

(56) References Cited

U.S. PATENT DOCUMENTS

| | | | | |
|---|---|---|---|---|
| 10,107,026 | B2 | 10/2018 | Dezorzi | |
| 10,740,993 | B2 | 8/2020 | Kim | |
| 11,472,332 | B1 * | 10/2022 | Salter | B60Q 1/247 |
| 12,337,794 | B2 | 6/2025 | Cheikh | |
| 2015/0258962 | A1 * | 9/2015 | Khanu | G07C 9/00309 701/2 |
| 2017/0200335 | A1 * | 7/2017 | Da Deppo | G07C 9/00309 |
| 2018/0099643 | A1 * | 4/2018 | Golsch | G01S 13/765 |
| 2018/0213355 | A1 * | 7/2018 | Smith | G01S 13/765 |
| 2020/0186970 | A1 * | 6/2020 | Dekovich | H04W 4/40 |
| 2021/0214988 | A1 * | 7/2021 | Wu | E06B 9/68 |
| 2021/0214991 | A1 * | 7/2021 | Cruz | B60R 25/01 |
| 2023/0339431 | A1 * | 10/2023 | Kuehner | B60R 25/305 |
| 2025/0026306 | A1 * | 1/2025 | Merz | B60R 25/01 |

* cited by examiner

*Primary Examiner* — Thomas D Alunkal
(74) *Attorney, Agent, or Firm* — KNOBBE, MARTENS, OLSON & BEAR, LLP

(57) ABSTRACT

Systems and methods are described herein for a system to automatically execute actions associated with moveable closures of one or more trunk compartments of a vehicle. The system may detect a user device is within proximity of the vehicle using ultra-wideband signals. The system may then determine a location of the user device, and based on the location of the user device, whether the user device is within a trigger zone. A trigger zone may represent a real-world area positioned about a trunk compartment of the vehicle, the trunk compartment comprising a moveable closure. Based on determining that the user device is within a trigger zone, the system may execute an action associated with the moveable closure.

20 Claims, 9 Drawing Sheets

Vicinity Zone 702

Lip Zone 704

Frunk Zone 706

0.85m

104E

106F

Vicinity
Range
708A

Vicinity
Range
708C

Lip Range
710A

106E

104B

104C

Vicinity
Range
708B

Lip Range
710B vv1 vv2 vh          vh

Lip Range
710C

Detect User Device — 802

Connect with User Device — 804

Determine Location of User Device based on Ultra-Wideband — 806

Determine Trigger Zone Positioned About a Vehicle Based on Location of User Device — 808

Execute Action Associated with One or More Movable Closures — 810

ULTRA WIDE BAND (UWB) BASED AUTOMATIC TRUNK ADJUSTMENT

RELATED APPLICATIONS

Any and all applications for which a foreign or domestic priority claim is identified in the Application Data Sheet as filed with the present application are incorporated by reference under 37 CFR 1.57 and made a part of this specification. The present application is being filed concurrently with U.S. application Ser. No. 18/766,457, entitled ULTRA WIDE BAND (UWB) BASED AUTOMATIC MOVE-ABLE CLOSURE ADJUSTMENT, which is incorporated herein by reference for all purposes.

BACKGROUND

Vehicles typically include moveable closures, such as doors or hoods, to enable access to different portions of the vehicle. With respect to doors, the doors typically have handles which may be used by persons entering the vehicle. Similarly, a hood may have a control within the vehicle, or a control proximate to the hood, with which a person may interact. These moveable closures have access control techniques, which typically include use of a key or key fob to unlock the vehicle. At present, such techniques may increase the time required to access the different portions of the vehicle.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
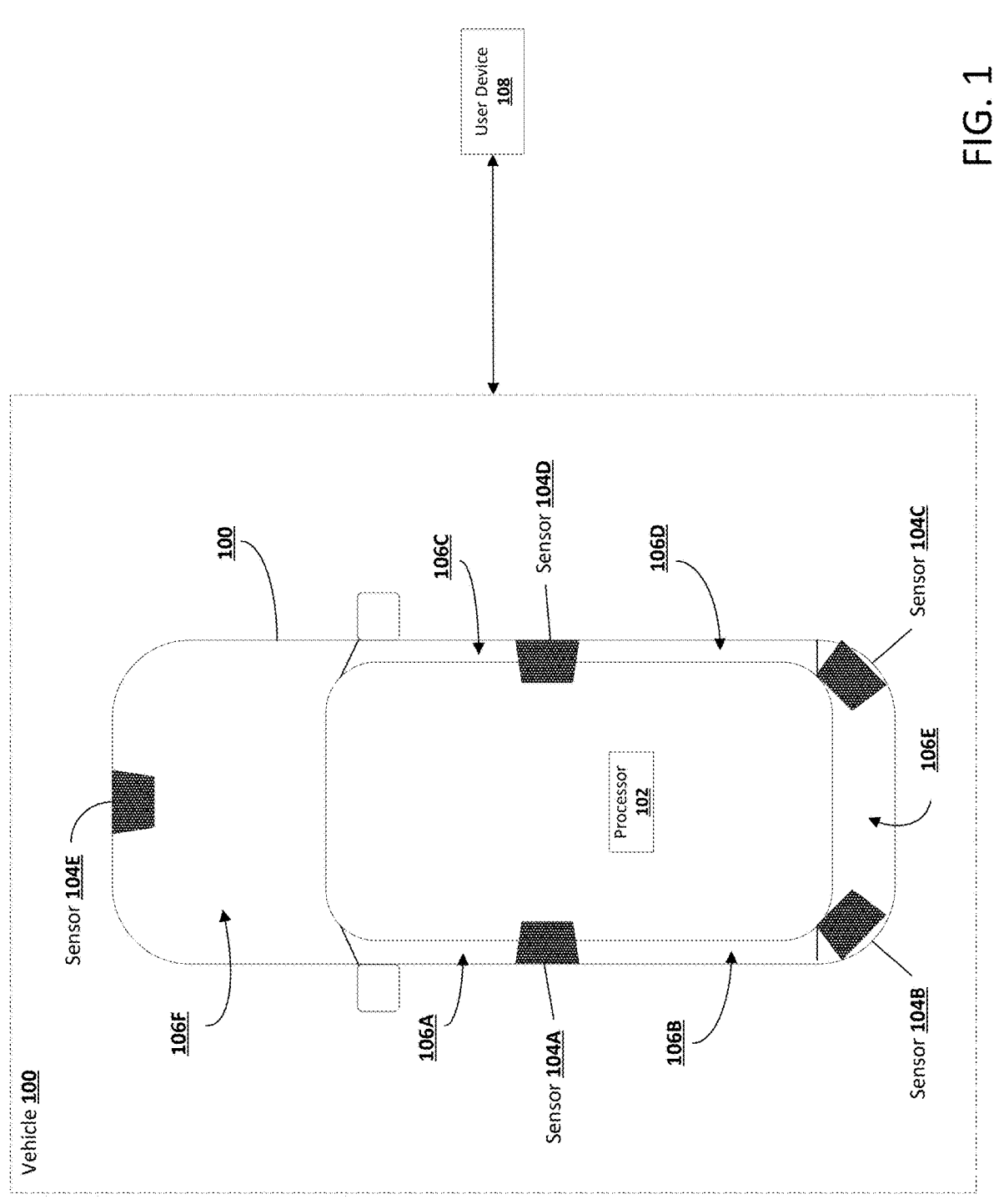
FIG. 1 depicts an example environment of a vehicle capable of detecting and locating a user device.

The systems and methods described herein provide for a system for automated moveable closure actions for a vehicle, such as automated opening and closing. Example moveable closures may include the doors of a vehicle, the trunk of a vehicle, a front trunk or hood of the vehicle, and so on. Modern mobile devices are configured with ever improving Bluetooth, Wi-Fi, and other signaling technolo-gies, such as ultra-wideband (UWB). UWB is similar to Bluetooth and Wi-Fi, but may be more precise, reliable and effective. Specifically, UWB may enable high-precision positioning of an UWB-enabled device. For example, UWB may allow for use of time of flight to enable substantially accurate determinations regarding a distance of a UWB mobile device to a sensor. This technology may be used to determine whether a person carrying a UWB-enabled device is within range of a vehicle. The technology may also be used to determine a location of the person based on use of a multitude of sensors. A system, such as a processing system of a vehicle, may use this information to determine whether to open or close a moveable closure; providing a hands-free experience for the user of the vehicle. For example, the system may use a UWB sensor to detect that an individual with a connected device is within range of the trunk of a vehicle and may determine to open the based on this information. This provides a convenience to someone who may not have a free hand to open the trunk moveable closure, such as because they are carrying an item to be deposited in the trunk.

In some cases, individuals may not want to wait for a long period of time for a door to open or may want an indication that the door will open when they walk up to it. Current systems may fail to be responsive to an individual's actions, such as not rapidly opening or closing a moveable closure as a person (e.g., a person authorized to access the vehicle) walks towards, or away from, the vehicle. Additionally, current systems may not quickly react to rearm automated door features based on an individual's action, such as leaving the vicinity of the vehicle. Further, current systems may not properly detect whether an individual is in- or outside of the vehicle and may accidentally close the door such that it impacts the individual.

The system described herein improves on existing tech-nology by using, in some embodiments, UWB based time-of-flight measurements from a connected user device to calculate a distance measurement of the user device to the vehicle. The system can derive ingress and egress of the user to open and close doors automatically. Additionally, the system may use the distance measurement, in combination with calculated trigger zones, to facilitate more responsive opening and closing of doors to user ingress and egress respectively. As will be described, these trigger zones may represent areas in which the user can be located (e.g., can enter) and which represent information to the system. In some embodiments, the areas may be circular or elliptical and be positioned about the vehicle. The trigger zones may also represent three-dimensional volumes of spaces about the vehicle. As one example described herein, the user may enter a first zone and the vehicle may cause a moveable closure (e.g., a driver-side door) to open partially. As the user enters a second, closer, zone (e.g., closer to the vehicle), the vehicle may cause the moveable closure to more fully open.

Thus, the system may provide for improved partial and/or full moveable closure-opening behaviors. Additionally, the system may provide for moveable closure closing behaviors, such as closing a first moveable closure when a user is detected at a different moveable closure. The system may also prevent a moveable closure from closing when a user is leaning into the vehicle, while standing outside of the vehicle with the door open.

Trigger zones may be areas or ranges in which, if one or more user devices is detected, a processor located within the vehicle may communicate a command to a moveable closure to perform a particular action, such as to partially open the moveable closure, open the moveable closure to a particular angle, open the moveable closure as far as possible (e.g., a maximum opening angle), partially close the moveable closure, close the moveable closure to a particular angle, or completely close the moveable closure. Certain trigger zones may reflet information to the system and may not cause an action to be performed. For example, a first trigger zone may indicate that a user is likely walking to the vehicle and a second trigger zone may cause a moveable closure to partially open. Thus, the first trigger zone may reflect a confirmatory trigger zone.

Trigger zones may be calculated, in one example, based on one or more ranges or areas around sensors included in a vehicle. The trigger zones may be proximate to the vehicle (e.g., encompass a portion of real-world area or space surrounding the vehicle). For example, a trigger zone may correspond to a circular range with a sensor as the center point and a particular distance from the sensor (e.g., 3 m, or some other distance) as a radius. In some embodiments, the range may include the interior of the vehicle. In some embodiments, the trigger zone may correspond to an arbitrary shape which is proximate to the vehicle and determined based on distances from the sensors. For example, the trigger zone may be elliptical, circular, rectangular, triangular, hexagonal, etc. For example, the trigger zone may be a triangle such that two endpoints correspond to two sensors and a third endpoint corresponds to an intersection point of two vectors, each starting at one of the two sensors.

In some cases, a trigger zone may be generated from the overlap of two or more circular or elliptical ranges. For example, a first circular or elliptical range may have a radius of 1.5 m from a first sensor, a second circular range may have a radius of 3 m from a second sensor. In this example, the ranges may overlap, and the trigger zone may be the area or volume of space which the two circular ranges overlap.

While the above describes determining distance of a user from a vehicle, as may be appreciated the vehicle may have a multitude of sensors positioned about the vehicle. In this way, the system may be able to accurately position the user about the vehicle (e.g., using triangulation or other techniques).

Environment

FIG. 1 depicts an example environment of a vehicle 100 capable of detecting and locating one or more user devices 108 (generally, user device 108). The vehicle 100 may include various forms of transport; for example, a car, truck, bus, boat, plane, etc. The vehicle 100 may include a processor 102, one or more sensors 104A-104E (generally referred to as sensors 104), and one or more moveable closures 106A-106F (generally referred to as moveable closures 106).

The processor 102 may be a central processing unit (CPU) or a graphics processing unit (GPU). The processor 102 may be configured to communicate with and/or receive data from the sensors 104. The processor 102 may be configured to communicate with and provide operational commands to the moveable closures 106. In some embodiments, the processor 102 may be configured to receive data from the sensors 104 and analyze the data to generate executable commands for the moveable closures 106.

The sensors 104 may include Bluetooth Low Energy (BLE) sensors or Ultra-Wideband (UWB) sensors. In some cases, the sensors may be configured for both BLE and UWB. The sensors 104 may be paired with one or more user devices 108. For example, the user devices 108 may be authenticated with the processor 102. In this example, authentication may refer to pairing (e.g., creating a link or secret key shared between devices or other pairing technique known by those skilled in the art), may refer to the user providing log-in information (user name and password) to an application on a user device which is authorized to communicate with the processor 102, and so on. The sensors 104 may connect to a user device one or more user devices 108 when the one or more user devices 108 is within a signal range of the sensors 104. In some cases, the sensors 104 may utilize BLE to detect when a one or more user devices 108 is within range of the vehicle 100 and may utilize UWB to determine a location of the one or more user devices 108 with respect to the vehicle 100 or the sensors 104. The sensors 104 may be located around the vehicle 100. For example, as illustrated, sensor 104A is located on the middle-left-side of the vehicle 100, sensor 104B is located on the rear-left-side of the vehicle 100, sensor 104C is located on the rear-right side of the vehicle 100, sensor 104D is located on the middle-right-side of the vehicle 100, and sensor 104E is located on the front of the vehicle 100. In some embodiments, there may be more or fewer sensors 104, and/or the sensors 104 may be located in different locations on the vehicle 100.

The moveable closures 106 may include doors (e.g., front doors, rear doors, and so on), a trunk closure, and/or a hood of the vehicle 100. For example, as illustrated, moveable closure 106A is a front driver-side door, moveable closure 106B is a rear driver-side door, moveable closure 106C is a front passenger-side door, moveable closure 106D is a rear passenger-side door, moveable closure 106E is a rear moveable closure (also referred to as a "trunk closure"), and moveable closure 106F is front trunk hood. The one or more moveable closures 106 may be receive commands from the processor 102, for example commands to open or close. In some embodiments, the vehicle 100 may include more or fewer moveable closures, moveable closures in different locations, or moveable closures of different sizes and/or shapes.

The one or more user devices 108 may comprise mobile devices or other devices configured to receive and/or broadcast BLE and/or UWB signals. For example, a user device 108 may be a smartphone, wearable device, tablet, smart key fob, etc. In some embodiments, the one or more user devices 108 may be configured to pair with the sensors 104, such that a user device 108 may connect with one or more of the sensors 104 when within signal range (e.g., of the sensors).

Automated Door Opening

Figure 2:
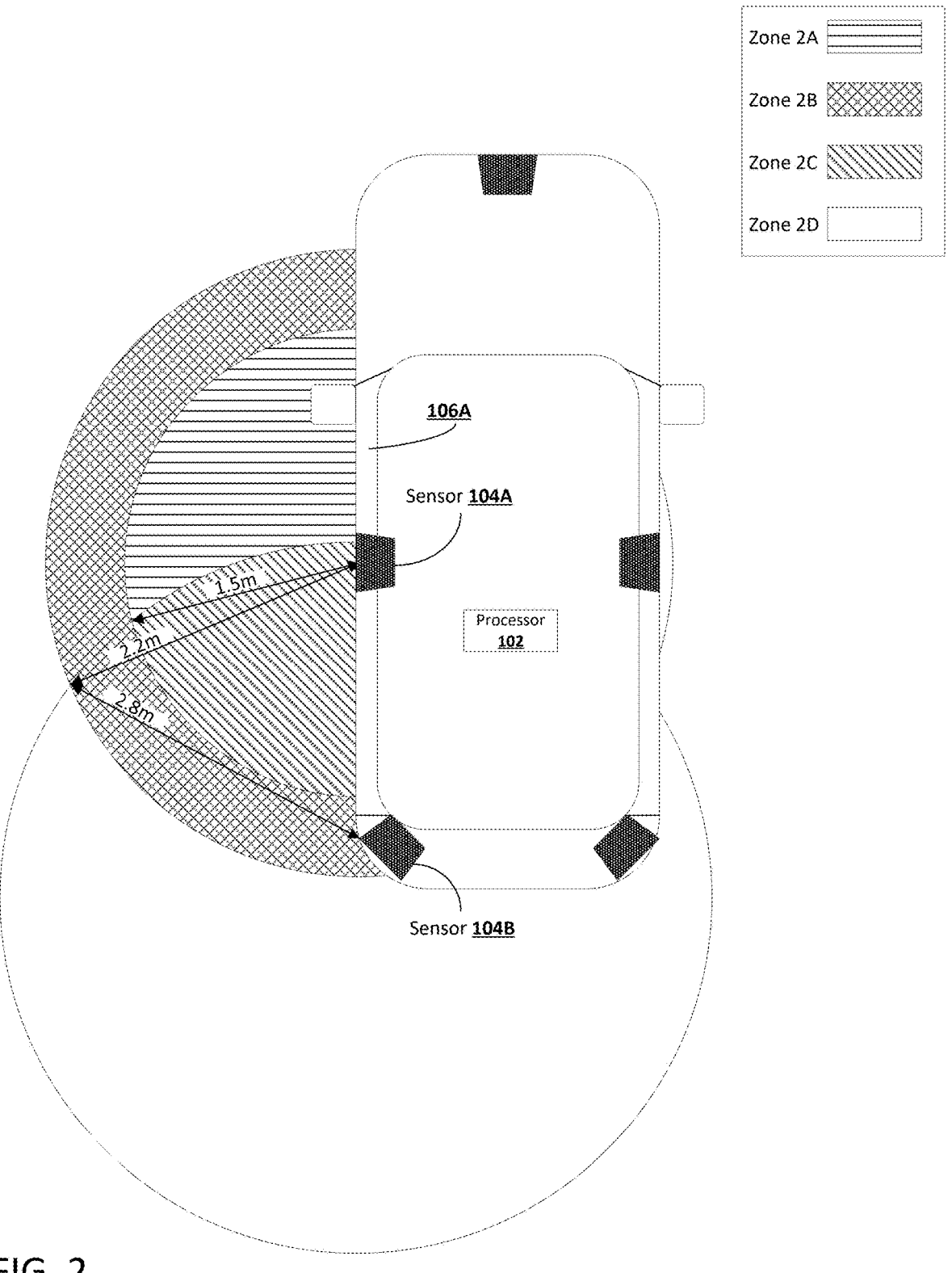
FIG. 2 illustrates an example of geographic trigger zones for automated moveable closure opening.

FIG. 2 illustrates an example of geographic trigger zones for automated moveable closure opening. The illustrated example depicts geographic trigger zones for opening a moveable closure 106A (e.g., a door) based on data from the sensor 104A and the sensor 104B. The illustrated example includes trigger zones 2A-2D.

The Zones 2A-2D may each be associated with a particular action or inaction. Actions may include a partial-open action. For example, when a user device 108 is detected within a zone associated with a partial-open action, the processor can communicate a command to the moveable closure 106A to partially open. Detection may be effectuated based on distance from the user device 108 to one or more sensors (e.g., using UWB as described herein). A partial open may include opening the moveable closure 106A to a particular opening angle. For example, a motor associated with the moveable closure 106A may be triggered to open to the particular opening angle. An opening angle may correspond to a number of degrees by which a car door is rotated about a particular hinge point. In some embodiments, the moveable closures 106 may rotate horizontally, or vertically at a fixed hinge. For instance, a partial open command may comprise opening the moveable closure 106A such that the opening angle is 15 degrees (or some other angle). A partial open may be a percentage based on the maximum opening angle for the moveable closure 106A. For example, if the maximum opening angle is 90 degrees, a partial open command may correspond to opening the door 30 percent (or a different percent less than 100% and greater than 0%) of the maximum swing angle. In some embodiments, a door may slide rather than swing. In such embodiments, a partial open may comprise opening the moveable closure 106A a particular slide distance that is a percentage (less than 100% and greater than 0%) of the maximum slide distance for the door.

In some embodiments, a zone may be associated with a partial-open action because that zone is located in relation to the vehicle 100 such that a person within the zone would be impacted by the associated moveable closure 106 if the moveable closure 106 were to fully open. In some embodiments, a zone may be associated with a partial-open action because the zone is within a vicinity of the vehicle 100 and/or an associated moveable closure 106 that corresponds to a typical location a user passes through before reaching the vehicle 100 to open the associated moveable closure 106.

Actions may include a full-open action. For example, when a user device 108 is detected within a zone associated with a full-open action, the processor can communicate a command to the moveable closure 106A to fully open. A full open may include opening the moveable closure 106 to the maximum opening angle. In some embodiments, the maximum opening angle may correspond to a programmatically set maximum opening angle, for safety or other reasons, rather than the maximum angle the moveable closure 106 can physically be opened.

In some embodiments, a zone may be associated with a full-open action because that zone is located in relation to the vehicle 100 such that a person within the zone would not be impacted by the associated moveable closure 106 if the moveable closure 106 fully opens. In some embodiments, a zone may be associated with a full-open action because the zone is within a vicinity of the vehicle 100 and/or an associated moveable closure 106 that corresponds to a typical location a user stands before opening a moveable closure 106 of the 100.

Some zones may be associated taking no action. For example, a zone may be used to monitor the movement of a user or proximity of a user to the vehicle 100, rather than to trigger an action. For example, when a user device 108 is detected within an inaction zone, the sensors 104 may detect a location of a user device 108 at a first time and the location of the user device 108 at a second time. Based on the two detections, the processor 102 may determine that the user is within proximity of the vehicle and moving towards a particular moveable closure 106. However, the zone may indicate that the user device 108 is not close enough to warrant a door action.

In the illustrated example, the Zone 2A and the Zone 2B correspond to partial-open actions, the Zone 2C corresponds to a full open action, and the Zone 2D is an inaction zone.

As described herein, trigger zones may be associated with one or more circular ranges calculated based on the location of a sensor and a distance from the sensor. In the illustrated example, the Zone 2A can be calculated based on two circular ranges, the first range corresponding to sensor 104A, and the second range corresponding to sensor 104B. The first range may be calculated as a circle using the location of sensor 104A as a center point and a predetermined distance of 1.5 meters (or a shorter or longer distance) away from the vehicle 100 as a radius. The second range may be calculated using the location of sensor 104B as a center point and a distance of 2.8 m (or a shorter or longer distance) away from the vehicle 100 as a radius. The Zone 2A can correspond to the portion of the first range which does not overlap with the second range. The Zone 2C can correspond to the portion of the first range which overlaps with the second range. The Zone 2B can be calculated based on the first range, and a third range. The third range may be calculated using the location of sensor 104A as a center point and a distance of 2.2 m (or a shorter or longer distance) away from the vehicle 100 as a radius. The Zone 2B can correspond to the portion of the third range which does not overlap with the first range.

In some embodiments, the system may detect a user device 108 in a particular zone for a particular duration before triggering an associated action. For instance, a user device 108 may be detected in a full-open zone for 5 seconds (or a shorter or longer amount of time) for the processor 102 to communicate a full-open command to the associated moveable closure 106.

In some embodiments, the system can react to multiple detected user devices 108. For example, if the system detects a first user device 108 in the Zone 2A and a second user device 108 in the Zone 2C, the system may determine to trigger the partial-open action of the Zone 2A rather than the full-open action of the Zone 2C as a full-open action may result in impacting a user located within the Zone 2A. In another example, however, if the system detects a first user device 108 in the Zone 2C and a second user device 108 in the Zone 2D, the system may determine to trigger the full-open action of the Zone 2C since the Zone 2D is associated with inaction and a user is within a zone where they may expect the vehicle 100 to react to the presence of the user.

In some embodiments, the system may trigger an open action based on preconditions being satisfied. For example, the system may determine not to trigger an open action if the vehicle 100 is in drive. In some embodiments, the system may determine not to trigger an open action if the front row seats are occupied. In some embodiments, the system may determine not to trigger an open action if the user device is detected to be within the vehicle 100. In some embodiments, the system may use one or more of BLE, a received signal strength indicator (RSSI), and a machine-learning algorithm to determine whether the user device is within the vehicle 100.

Although described with reference to the moveable closure 106A, the disclosure is not limited to the moveable closure 106A and may apply to any of the moveable closures 106. In some embodiments, there may be more, less, or different zones. In some embodiments, the zones may be smaller or larger. In some embodiments, the zones may be differently shaped, such as rectangular, triangular, elliptical, etc.

Rearming Automating Door Opening After Manual Closing

Figure 3:
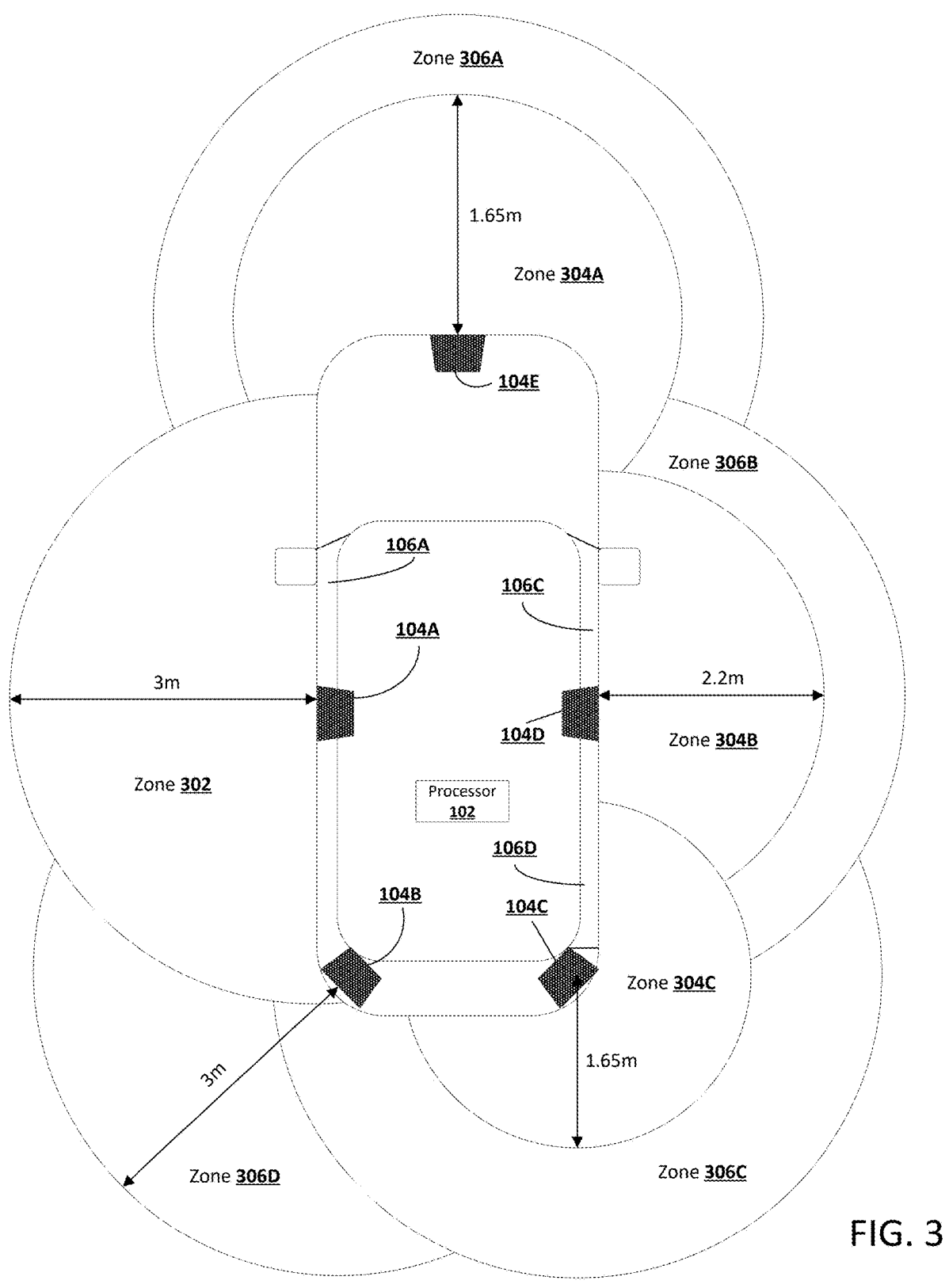
FIG. 3 illustrates an example of geographic trigger zones to rearm automated moveable closure opening after a manual closing.

FIG. 3 illustrates an example of geographic trigger zones to rearm automated door opening after a manual closing. The illustrated example depicts geographic trigger zones for rearming automated door opening for the vehicle 100 after a manual closure of the moveable closure 106A based on data from the sensors 104. The illustrated example includes the Zone 302, the Zones 304A-304C (generally referred to as Zones 304), and the Zones 306A-306D (generally referred to as Zones 306).

The Zones 302, 304, and 306 may each be associated with a rearm opening action. In some embodiments, the system may be configured not to perform any of the actions described with reference to FIG. 2 for any of the moveable closures 106 after at least one moveable closure 106 has been manually closed by a user, despite detecting a user within the Zones 2A-2C, until a rearm action occurs. A rearm opening action may act as a trigger for the system to resume performing automated moveable closure opening actions. The system may be configured to trigger a rearm action when a user is within a particular rearm action zone, or when no users are detected within the rearm action zone.

In the illustrated example, the system is configured to execute a rearm open action once no user devices 108 are detected within the Zone 302, after having detected at least one user device 108 within the Zone 302. The Zone 302 may be within a particular vicinity of moveable closure 106A such that a user would be unlikely to expect the moveable closure 106A to open after having manually closed the moveable closure 106A. For example, a user may have gotten something out of the vehicle 100 and may be preparing to walk away from, rather than enter, the vehicle 100. Once a user has moved a certain distance away from the vehicle 100, such as out of the Zone 302, the system may perform a rearm action so that if or when the user returns to the vehicle, the moveable closure 106 will automatically open.

In the illustrated example, the Zone 302 can be determined (e.g., calculated) based on a first circular range. The first circular range may be calculated using the location of the sensor 104A as a center point and a distance of 3 m (or a shorter or longer distance) away from the vehicle 100 as a radius.

In the illustrated example, the system is configured to execute a rearm action once a user device 108 is detected within a Zone 304. The system may be configured to execute the rearm action even if a user device is still detected in the Zone 302. Each of the Zones 304 may be within a particular vicinity of vehicle 100 such that the system may predict that the user will want to open a moveable closure 106. For example, a user may close the moveable closure 106A and walk around the front or rear of the vehicle 100 intending to open the moveable closure 106C and/or the moveable closure 106D. Consequently, the system can execute a rearm action so that the moveable closure 106C and/or the moveable closure 106D will automatically open when the user approaches. In some embodiment, the system can execute a rearm action on all moveable closures 106 so that any moveable closure 106 will automatically open when a user approaches. For example, a user may close the 106A and walk around the front or rear of the vehicle 100, and into a zone 304, intending to open the moveable closure 106C and/or the moveable closure 106D, but may realize they need an item more readily accessible by opening moveable closure 106A and thus may turn around and walk back to the moveable closure 106A.

In the illustrated example, the Zone 304A can be calculated based on a second circular range. The second circular range may be calculated using the location of the sensor 104E as a center point and a distance of 1.65 m (or a shorter or longer distance) away from the vehicle 100 as a radius. the Zone 304B can be calculated based on a third circular range. The third circular range may be calculated using the location of the sensor 104D as a center point and a distance of 2.2 m (or a shorter or longer distance) away from the vehicle 100 as a radius. The Zone 304C can be calculated based on a fourth circular range. The fourth circular range may be calculated using the location of the sensor 104C as a center point and a distance of 1.65 m (or a shorter or longer distance) away from the vehicle 100 as a radius.

In some embodiments, the system may be configured to execute a rearm action once no user devices 108 are detected within the Zone 302 but detected within a Zone 304, or outside of a Zone 306, after having previously detected at least one user device 108 within the Zone 302. In some embodiments, the system may be configured to execute a rearm action once no user devices 108 are detected within the Zone 302, a Zone 304, or a Zone 306, after having previously detected at least one user device 108 within the Zone 302, a Zone 304, or a Zone 306. In some embodiments, once a user has moved a certain distance away from the vehicle 100, the system may perform a rearm action so that if or when the user returns to the vehicle, the moveable closure 106 will automatically open.

In the illustrated example, the Zone 306A can be calculated based a fifth circular range. The fifth circular range may be calculated using the location of the sensor 104E as a center point and a distance of 3 m (or a shorter or longer distance) away from the vehicle 100 as a radius. The Zone 306A can correspond to the portion of the fifth range that does not overlap with the first, second, third, or fourth range.

The Zone 306B can be calculated based a sixth circular range. The sixth circular range may be calculated using the location of the sensor 104D as a center point and a distance of 3 m (or a shorter or longer distance) away from the vehicle 100 as a radius. The Zone 306B can correspond to the portion of the sixth range that does not overlap with the first, second, third, or fourth range.

The Zone 306C can be calculated based a seventh circular range. The seventh circular range may be calculated using the location of the sensor 104C as a center point and a distance of 3 m (or a shorter or longer distance) away from the vehicle 100 as a radius. The Zone 306C can correspond to the portion of the seventh range that does not overlap with the first, second, third, or fourth range.

The Zone 306D can be calculated based an eighth circular range. The eighth circular range may be calculated using the location of the sensor 104B as a center point and a distance of 3 m (or a shorter or longer distance) away from the vehicle 100 as a radius. The Zone 306D can correspond to the portion of the eighth range that does not overlap with the first, second, third, or fourth range.

Although described with reference to the moveable closure 106A, the disclosure is not limited to the moveable closure 106A and may apply to any of the moveable closures 106. In some embodiments, there may be more, less, or different zones. In some embodiments, the zones may be smaller or larger. In some embodiments, the zones may be differently shaped, such as rectangular, triangular, elliptical, etc.

Automated Moveable Closure Closing

Figure 4:
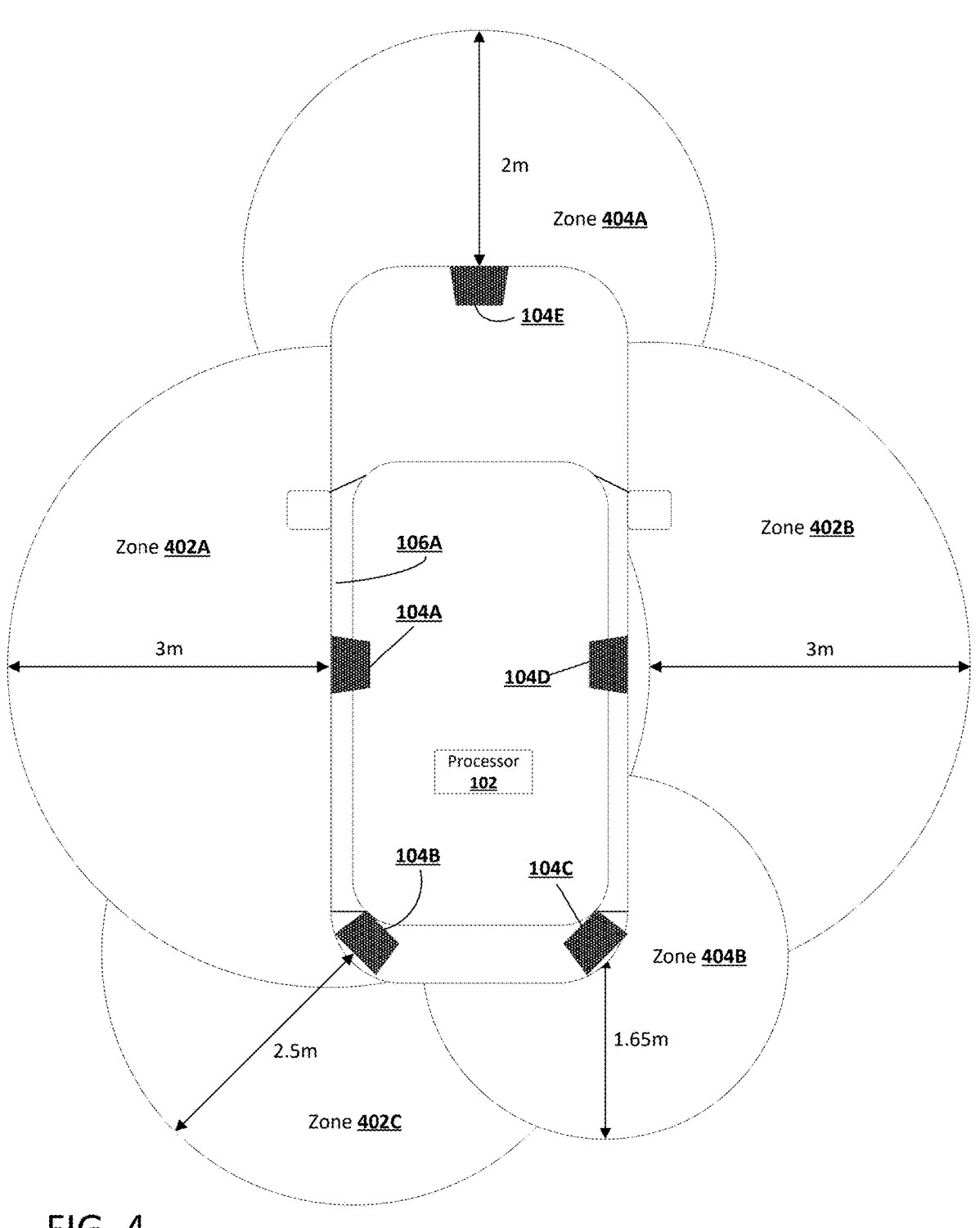
FIG. 4 illustrates an example of geographic trigger zones for automated moveable closure closing.

FIG. 4 illustrates an example of geographic trigger zones for automated moveable closure closing. The illustrated example depicts geographic trigger zones for closing the moveable closure 106A based on data from the sensors 104. The illustrated example includes trigger Zones 402A-402C (generally referred to as Zones 402), and trigger Zones 404A and 404B (generally referred to as Zones 404).

The Zones 402 and 404 may be associated with a closing action or inaction. A closing action may be associated with closing one or more moveable closures 106. For example, when at least one user device 108 is detected within a zone out of range of a particular moveable closure 106, and no user devices 108 are detected within a zone within range of a particular moveable closure 106, the system may be configured to execute an action to close the particular moveable closure 106. In some cases, a zone may be within range of a particular moveable closure 106 such that the system may be configured to keep a moveable closure 106 open so long as a user device 108 is detected within the zone. In some embodiments, the system can be configured to execute a moveable closure closing action for a particular moveable closure 106 only after determining that the particular moveable closure 106 is open.

In the illustrated example, the Zones 402 are associated with inaction. If at least one user device 108 is detected within a Zone 402, the system can be configured to prevent a moveable closure closing action for the moveable closure 106A. The Zone 402A can be calculated based on a first circular range. The first circular range may be calculated using the location of the sensor 104A as a center point and a distance of 3 m (or a shorter or longer distance) away from the vehicle 100 as a radius. The Zone 402B can be calculated based on a second circular range. The second circular range may be calculated using the location of the sensor 104D as a center point and a distance of 3 m (or a shorter or longer distance) away from the vehicle 100 as a radius. The Zone 402C can be calculated based on a third circular range. The third circular range may be calculated using the location of the sensor 104B as a center point and a distance of 2.5 m (or a shorter or longer distance) away from the vehicle 100 as a radius.

In the illustrated example, the Zones 404 are associated with a moveable closure closing action. If at least one user device 108 is detected within a Zone 404, and no user devices 108 are detected within a Zone 402, the system may be configured to execute a moveable closure closing action for the moveable closure 106A. The system may determine to keep the moveable closure 106A open even if a user device 108 is detected in a Zone 404, so long as a user device 108 is detected in a Zone 402. The Zone 404A can be calculated based on a fourth circular range. The fourth circular range may be calculated using the location of the sensor 104E as a center point and a distance of 2 m (or a shorter or longer distance) away from the vehicle 100 as a radius. The Zone 404B can be calculated based on a fifth circular range. The fifth circular range may be calculated using the location of the sensor 104C as a center point and a distance of 1.65 m (or a shorter or longer distance) away from the vehicle 100 as a radius.

In some embodiments, the system may be configured to execute a moveable closure closing action once no user devices 108 are detected within the Zones 402 or detected within the Zones 404.

Although described with reference to the moveable closure 106A, the disclosure is not limited to the moveable closure 106A and may apply to any of the moveable closures 106. In some embodiments, there may be more, less, or different zones. In some embodiments, the zones may be smaller or larger. In some embodiments, the zones may be differently shaped, such as rectangular, triangular, elliptical, etc.

Rearming Automated Moveable Closure Closing

Figure 5:
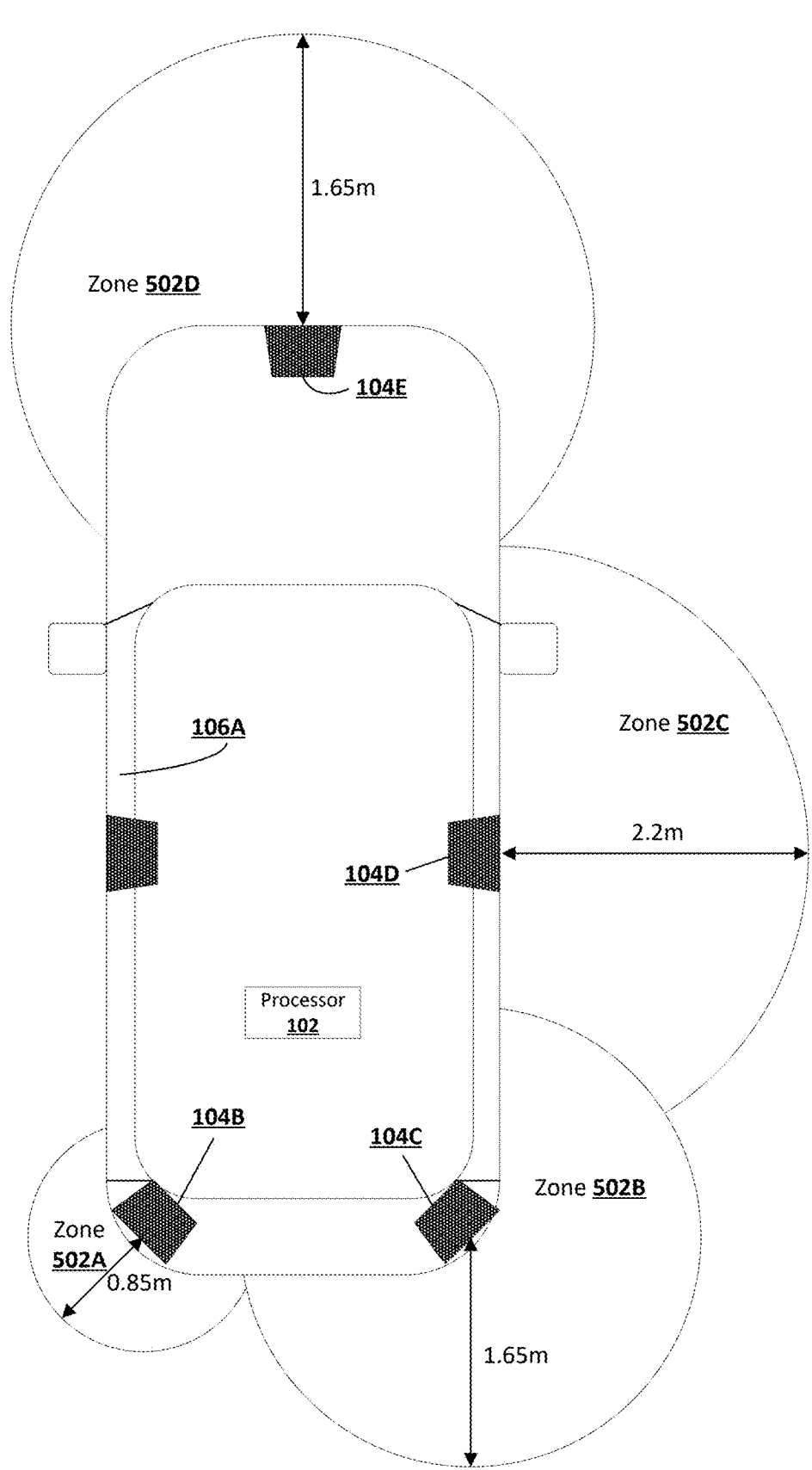
FIG. 5 illustrates an example of geographic trigger zones to rearm automated moveable closure closing after an auto-mated moveable closure opening.

FIG. 5 illustrates an example of geographic trigger zones to rearm automated moveable closure closing after an automated moveable closure opening. The illustrated example depicts geographic trigger zones for rearming automated moveable closure closing for the vehicle 100 after an automated opening of the moveable closure 106A based on data from the sensors 104. The illustrated example includes the Zones 502-502D (generally referred to as Zones 502).

In some embodiments, the system may be configured not to perform any of the actions described with reference to FIG. 4 for the moveable closure 106A after the moveable closure 106A has been automatically opened, until a rearm closing action occurs. In some embodiments, the system may be configured to wait a minimum of 10 seconds (or a shorter or longer amount of time) after an automatic moveable closure opening before executing a rearm closing action. This may be referred to as a cool down period. This cool down period may help prevent the system from closing a moveable closure 106 such that a user may be impacted. In some cases, however, one or more user devices 108 may be detected near the vehicle 100, but not near the moveable closure 106A which was automatically opened. In such cases, the system may be configured to execute a rearm closing action without waiting for the duration of the cool down period. For example, a user may be standing within a particular vicinity of the vehicle 100 and from the moveable closure 106A such that they are out of range of the moveable closure 106A and will not be impacted by the moveable closure 106 when closed. To ensure a quick closure of the moveable closure 106 once a user is out of range, a rearm closing action may be executed once one or more user devices are detected in a location outside of the moveable closure closing range associated with the moveable closure 106A. In the illustrated example, the system is configured to execute a rearm closing action once a user device is detected within at least one of the Zones 502.

In the illustrated example, the Zone 502A can be calculated based on a first circular range. The first circular range may be calculated using the location of the sensor 104B as a center point and a distance of 0.85 m (or a shorter or longer distance) away from the vehicle 100 as a radius. The Zone 502B can be calculated based on a second circular range. The second circular range may be calculated using the location of the sensor 104C as a center point and a distance of 1.65 m (or a shorter or longer distance) away from the vehicle 100 as a radius. The Zone 502C can be calculated based on a third circular range. The third circular range may be calculated using the location of the sensor 104D as a center point and a distance of 2.2 m (or a shorter or longer distance) away from the vehicle 100 as a radius. The Zone 502D can be calculated based on a fourth circular range. The fourth circular range may be calculated using the location of the sensor 104E as a center point and a distance of 1.65 m (or a shorter or longer distance) away from the vehicle 100 as a radius.

Although described with reference to the moveable closure 106A, the disclosure is not limited to the moveable closure 106A and may apply to any of the moveable closures 106. In some embodiments, there may be more, less, or different zones. In some embodiments, the zones may be smaller or larger. In some embodiments, the zones may be differently shaped, such as rectangular, triangular, elliptical, etc.

Rearming Automated Moveable Closure Action After False Open

Figure 6:
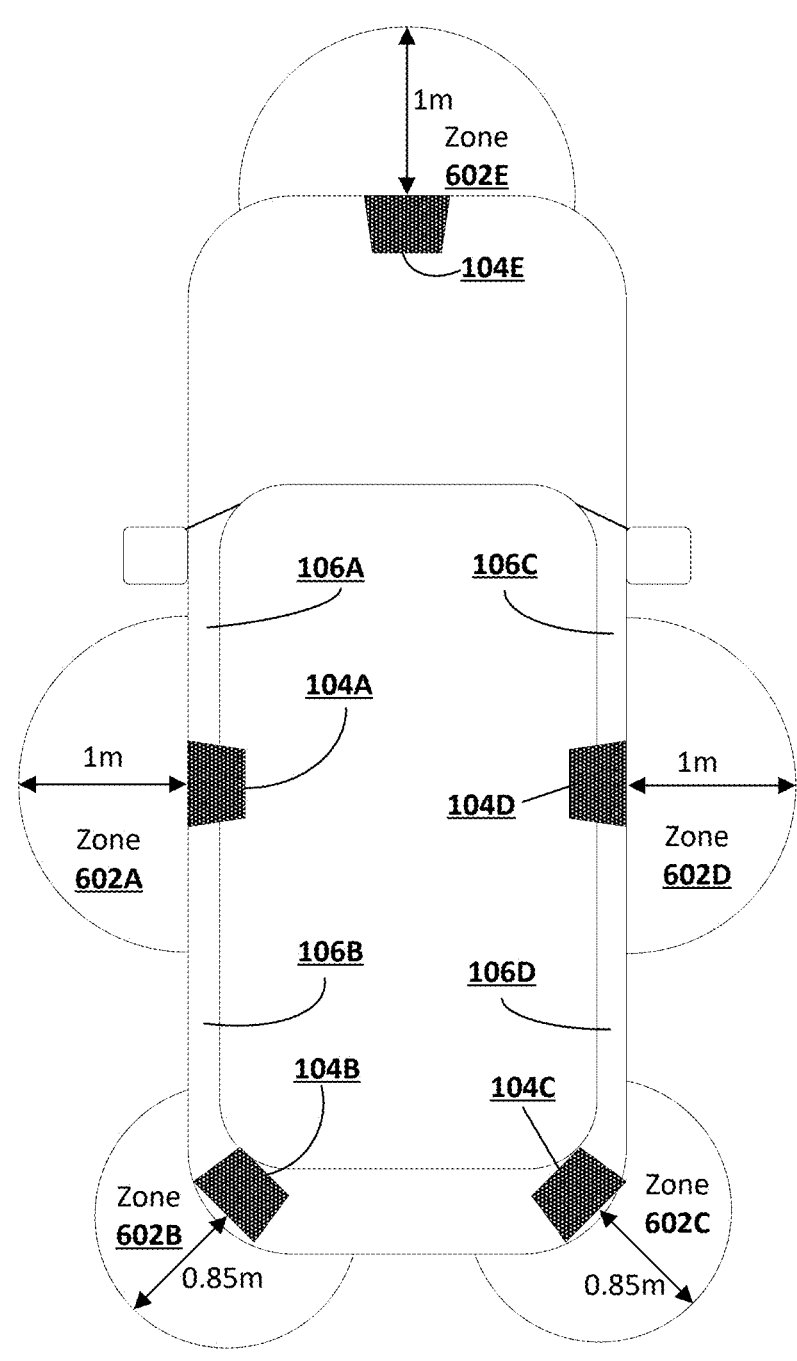
FIG. 6 illustrates an example of geographic trigger zones to rearm automated moveable closure action after a false open.

FIG. 6 illustrates an example of geographic trigger zones to rearm automated moveable closure action after a false open. The illustrated example depicts geographic trigger zones for rearming automated moveable closure actions for the vehicle 100 after false open of a moveable closure 106 based on data from the sensors 104. The illustrated example includes trigger Zones 602A-602E (generally referred to as Zones 602).

A false open may correspond to an opening and subsequent closing of a moveable closure 106 without occupancy of the corresponding seat. For example, a user may stand near a moveable closure 106A, for example in Zones 2A-2C while talking with someone, causing the moveable closure to open. The user may not intend to enter the vehicle 100 and may manually close the moveable closure 106A or may simply walk away from the vehicle 100, triggering an automatic close action. As another example, a user may walk up to the moveable closure 106A, the moveable closure 106A may automatically open, the user may lean in and retrieve an item from the vehicle 100 without getting into the vehicle 100 to sit in the driver's seat, the user may walk away from the vehicle 100, and the moveable closure 106A may automatically close. After a false open, the system may be configured to not perform any of the actions described with reference to FIGS. 2 and 4 until a rearm action is triggered.

In some embodiments, the system may ensure that the moveable closure 106A does not close on the user when leaning into the vehicle. For example, and as described above, the user may not actually sit in the driver's seat. In some embodiments, the system may obtain information from a sensor positioned under the seat to determine if the user has sat down. Thus, if the user has sat down the system may cause the moveable closure 106 to begin closing. In some embodiments, the system may use a camera positioned in the cabin of the vehicle to ensure that the user has sat down and moved his/her legs into the vehicle. In some embodiments, a camera may be positioned on a B-pillar of a vehicle.

In some embodiments, to determine whether a user is leaning into the vehicle, or into a window of the vehicle, to obtain something and not to sit, the system may leverage machine learning techniques. For example, the machine learning techniques may include a neural network, such as a dense or fully-connected neural network, which is trained to output information reflective of whether the user is leaning into the vehicle. In this example, the output may indicate a likelihood associated with the user leaning in, and not sitting, or a likelihood that the user is going to sit down. In some embodiments, labels may be assigned, or other information may be output. The neural network may be trained based on based on users with user devices in their hands/or pockets of their clothes. For example, the training data may reflect movement of phones and whether the user actually sat down. This movement data may represent the UWB distance information described herein; as an example, it may represent distances from different sensors positioned about the vehicle. Thus, the system may learn movement patterns, or indicia of movement or positioning actions, that correspond to "leaning into" movements. In some embodiments, the neural network may be pre-trained and provided to vehicles for execution (e.g., inference). For example, the neural network may be pre-trained using a Bluetooth received signal strength indicator (RSSI) with a user device placed in hand, clothing pocket, interior vehicle cabin locations (such as on a seat, in a cup holder, in phone charger locations, inside door or moveable closure pockets, on the floor of the cabin, etc.), and/or just exterior of the vehicle, and provided to vehicles for execution (e.g., inference). In some embodiments, the training data may be updated over time as users utilize the neural network. For example, image data (e.g., from an image sensors within the vehicle) may (e.g., based on user authorization) obtain images reflecting whether a user was leaning into a vehicle or actually sat down on a seat. Thus, the neural network's predictions may be updated over time.

In the illustrated example, the system is configured to execute a rearm action when at least one user device 108 is detected within at least one of the Zones 602. The Zone 602A can be calculated based on a first circular range. The first circular range may be calculated using the location of the sensor 104A as a center point and a distance of 1 m (or a shorter or longer distance) away from the vehicle 100 as a radius. The Zone 602B can be calculated based on a second circular range. The second circular range may be calculated using the location of the sensor 104B as a center point and a distance of 0.85 m (or a shorter or longer distance) away from the vehicle 100 as a radius. The Zone 602C can be calculated based on a third circular range. The third circular range may be calculated using the location of the sensor 104C as a center point and a distance of 0.85 m (or a shorter or longer distance) away from the vehicle 100 as a radius. The Zone 602D can be calculated based on a fourth circular range. The fourth circular range may be calculated using the location of the sensor 104D as a center point and a distance of 1 m (or a shorter or longer distance) away from the vehicle 100 as a radius. The Zone 602E can be calculated based on a fifth circular range. The fifth circular range may be calculated using the location of the sensor 104E as a center point and a distance of 1 m (or a shorter or longer distance) away from the vehicle 100 as a radius.

In some embodiments, there may be more, less, or different zones. In some embodiments, the zones may be smaller or larger. In some embodiments, the zones may be differently shaped, such as rectangular, triangular, elliptical, etc.

Automated Actions for Trunk Closures and Front Trunk Hoods

Figure 7:
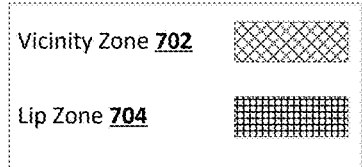
FIG. 7 illustrates an example of geographic trigger zones for automated opening of a moveable closure located in the rear or front of a vehicle.

FIG. 7 illustrates an example of geographic trigger zones for automated opening of a moveable closure located in a rear portion or front portion of a vehicle, such as a trunk closure, or a front trunk hood. The illustrated example depicts geographic trigger zones for opening the moveable closures 106E and 106F. In the illustrated example, the moveable closure 106E is a trunk closure, and the moveable closure 106F is a front trunk hood. The illustrated example includes a vicinity zone 702, a lip zone 704, and a frunk zone 706. The vicinity zone 702, the lip zone 704, and the frunk zone 706 may each be associated with a moveable closure open action.

The system may be configured to execute a moveable closure open action based on a set of rules or information. In some embodiments, the system may be configured to prevent a false open, by only initiating a moveable closure open sequence when a user device 108 is detected within a trigger zone after the user device 108 is detected within an associated proximity range (e.g., the vicinity range 708A-708B, or the lip range 710A-710B). Additionally, in some embodiments, the system may be configured to prevent a false open by determining a speed of a user device. The system may determine based on the difference in location between two or more detections of a user device 108, that the user device 108 is moving at a speed typically associated with walking past the vehicle 100. For example, the system may determine that the distance between a first user device detection and a second user device detection is greater than 11 cm (or a longer or shorter distance) and may determine that the user device is moving at too great a speed to initiate a moveable closure open sequence. In some embodiments, the system may be configured to initiate a moveable closure open sequence once a device has been detected in the vicinity zone 702 for a certain period of time, such as 2.25 seconds (or a shorter or longer period). Additionally, in some embodiments, the system will not initiate a moveable closure open sequence, if it detects a moveable closure 106 is already open. In some embodiments, the system will not initiate a moveable closure open sequence unless a user has previously authorized automatic opening behaviors.

In some embodiments, one or more of the moveable closures 106 may comprise a light and an audio device capable of emitting sound. In some embodiments, a moveable closure open sequence comprises causing the light associated with a particular moveable closure 106 to be illuminated, blink and/or the audio device associated with a particular moveable closure 106 to emit a sound, such as a periodic or continuous ding, for a period of time (referred to as the detection duration), and then executing a moveable closure open action for the particular moveable closure 106 to open. In some cases, the detection duration may be a predetermined duration of time. For example, in some cases, the detection duration may be 2.25 seconds (or a shorter or longer amount of time). In some embodiments, the system may be configured to cause the light to blink and/or the sound to be emitted until the moveable closure is opened or until conclusion of the detection duration. In some embodiments, the system may be configured to cease the moveable closure open sequence if a user device exits a trigger zone before completion of the entirety or a portion of the detection duration. For example, the system may be configured to cease the moveable closure open sequence if a user exits a trigger zone within 1 second from the start of the sequence. Ceasing the moveable closure open sequence may comprise turning off the light and silencing the sound emitting device.

In some embodiments, the system may be configured not to initiate a moveable closure open sequence after a moveable closure closing, or after an uncompleted moveable closure open sequence for a period of time (referred to as a cool down period). The cool down period may comprise a duration of 2.5 seconds (or a shorter or longer time). In some embodiments, the system may be configured not to initiate a moveable closure open sequence after a moveable closure closing, or after an uncompleted moveable closure open sequence until a rearm opening sequence action occurs. This may reduce undesired repeated openings when a user remains within the vicinity of a rear- or front-trunk past the cool-down period or for an extended period of time (e.g., 30 seconds, 1, 5, 10, 30, or 45 minutes, 1, 2, 3, 5 hours, etc.). A rearm opening sequence action may act as a trigger for the system to resume normal opening sequence operations, including monitoring for whether a user device is within a trigger zone such as the vicinity zone 702, the lip zone 704, or the frunk zone 706. In some embodiments, a rearm opening sequence action may be triggered by a determination that a user device has been detected at least a certain distance (e.g., 1 meter, or a smaller or larger distance) outside of the vicinity zone 702 for a certain period of time (e.g., 2 seconds, or a shorter or longer period of time). In some embodiments, a rearm opening sequence action may be triggered by a determination that a user device has been detected within a particular range of another moveable closure of the vehicle for at least a certain period of time (e.g., 2 seconds, or a shorter or longer amount of time). For example, a rearm opening sequence action may be triggered once the user device 108 is detected within the zone 702, or a zone 704 for at least 2 seconds (or a shorter or longer period of time). In some embodiments, the range may comprise a different shape, or size. In some embodiments, a rearm opening sequence action may be triggered by a determination that a user device has not been detected by the system for a certain period of time (e.g., 10 seconds, or a shorter or longer period of time).

In some embodiments, the system may be configured to determine whether a key or user device is inside a rear- or front-trunk compartment based on the location of the key or user device. For example, the system may determine that the moveable closure 106E is closed, and that the user device 108 has remained within the vicinity zone 702 for a period of time (e.g., 1 minute, or another period of time, such as 30 second, 2 minutes, 5 minutes, etc.) since the moveable closure 106E was closed. Based on this determination, the system may further determine that the user device 108 is within the rear-trunk compartment of the vehicle 100. In another example, the system may determine that the user device 108 is located within the front-trunk compartment of the vehicle 100 based on a determination that the 106F is closed and that the user device 108 has remained within the frunk zone 706 for a period of time (e.g., 1 minute, or another period of time, such as 30 second, 2 minutes, 5 minutes, etc.) since the moveable closure 106F was closed.

In some embodiments, based on a determination that a key or user device is located within a rear- or front-trunk compartment, the system may be configured to prevent the key or user device from opening the associated moveable closure until a user device-rearm trigger occurs. For example, based a determination that the user device 108 is located within the rear-trunk compartment of the vehicle 100, the system can prevent the moveable closure 106E from opening, despite determining that the user device 108 is within the vicinity zone 702. This may help prevent undesired opening actions in situations where a user places a key or user device in a bag and places the bag in a trunk compartment. In some embodiments, a user device-rearm trigger may comprise a determination that the user device is outside the vicinity zone 702 and within range of a different moveable closure. In some embodiments, a user device-rearm trigger may comprise a manual opening of the associated moveable closure. For example, if the system determined that the user device 108 was located within the rear-trunk compartment, a user device-rearm trigger can be a manual opening of the moveable closure 106E.

In the illustrated example, the vicinity zone 702 can be calculated as an ellipse based on the center point between the sensor 104B and the sensor 104C, vv1 and vv2 as vertices, a first point located on the circumference of the vicinity range 708A, wherein the first point is the intersection point of vectors represented by vs1 and vs2, and a second point located on the circumference of the vicinity range 708B, wherein the second point is a complementary point to the first point. As illustrated, the circular range of the vicinity range 708A and the circular range of the vicinity range 708B each have a radius corresponding to the length of vh. The vv1 may be a point a particular distance (e.g., 0.5 m or a shorter or longer distance) away and to the left of the center point along the −x axis. The vv2 may be a point a particular distance (e.g., 0.5 m or a shorter or longer distance) away and to the right of the center point along the x-axis.

In the illustrated example, the lip zone 704 can be calculated as an ellipse based on the center point between the sensor 104B and the sensor 104C, the locations of the sensor 104B and the sensor 104C as vertices, a first point located on the circumference of the lip range 710A, wherein the first point is the intersection point of vectors represented by Is1 and Is2, and a second point located on the circumference of the lip range 710B, wherein the second point is a complementary point to the first point. As illustrated, the circular range of the lip range 710A and the circular range of the vicinity range 710B each have a radius corresponding to the length of Ih.

In the illustrated example, the frunk zone 706 can be calculated based on a circular range. The circular range may be calculated using the location of the sensor 104E as a center point and a distance of 0.85 m (or a shorter or longer distance) away from the vehicle 100 as a radius.

In some embodiments, there may be more, less, or different zones. In some embodiments, the zones may be smaller or larger. In some embodiments, the zones may be differently shaped, such as rectangular, triangular, elliptical, etc.

Automated Moveable Closure Action Process

Figure 8:
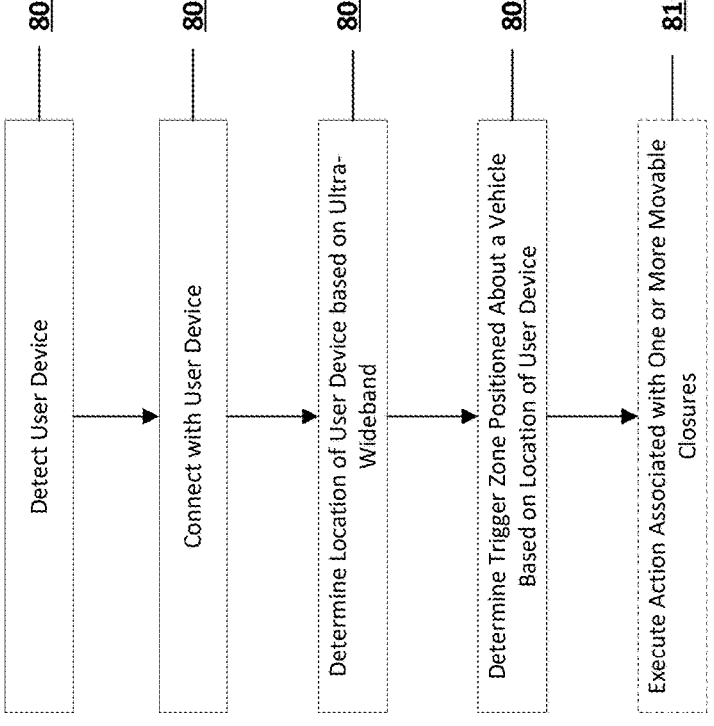
FIG. 8 is a flow diagram illustrating an example embodi-ment of a process for triggering an automated moveable closure action associated with a door.

FIG. 8 is a flow diagram illustrating an example embodiment of a process for determining whether to trigger an automated moveable closure action. Although steps are illustrated in a particular order, steps may be performed multiple times, the order of the steps can be changed, and/or one or more steps can be performed concurrently. Additionally, fewer, more, or different steps can be performed.

At Block 802, the system detects a user device 108. One or more of the sensors 104 may periodically broadcast advertisement packets using BLE. The user device 108 may receive one of the advertisement packets and analyze the packet to determine if the packet is associated with a recognized device. In some embodiments, the user device 108 may have previously paired with (e.g., authenticated with) at least one of the sensors 104, such that the user device 108 recognizes advertisement packets broadcast by at least one of the sensors 104 as coming from an authorized device. The user device 108 may transmit a request to connect to at least one of the sensors 104.

At Block 804, at least one of the sensors 104 may connect to the user device 108. Connection may facilitate communication between the sensor and the user device 108. In some embodiments, the at least one sensor 104 may use BLE to connect with a user device 108 and then use UWB to determine a location of the user device 108.

At Block 806, the system may use at least one of the sensors 104 to determine a location of the user device 108. At least one of the sensors 104 may transmit a UWB signal to the user device 108, which may provide a return signal. The system may be configured to calculate a time-of-flight based on the transmitted and returned signals. The time-of-flight can then be used to determine a location of the user device 108 in reference to the at least one sensor 104.

At Block 808, the system may determine that the user device 108 is located within a particular trigger zone based on the location of the user device 108 determined at Block 806. In some cases, the system may determine that the user device 108 is located outside of a particular trigger zone. For example, the trigger zones may correspond to one or more Zones described herein with reference to FIGS. 2-7. In some cases, as described herein, the system may be configured to take a certain action based on whether the user device 108 is inside or outside of one or more trigger zones.

At Block 810, the system may trigger a moveable closure action based on the location of the user device 108 and the associated trigger zone determined at block 808. For example, as described herein with reference to FIG. 2, the system may execute a moveable closure open action if the user device 108 is detected within a partial-open or full-open trigger zone. In some cases, as described herein, a trigger zone may be associated with inaction and thus the system may determine to wait for another detection to take an action. For example, the trigger zones may correspond to actions as described herein with reference to FIGS. 2-7.

Figure 9:
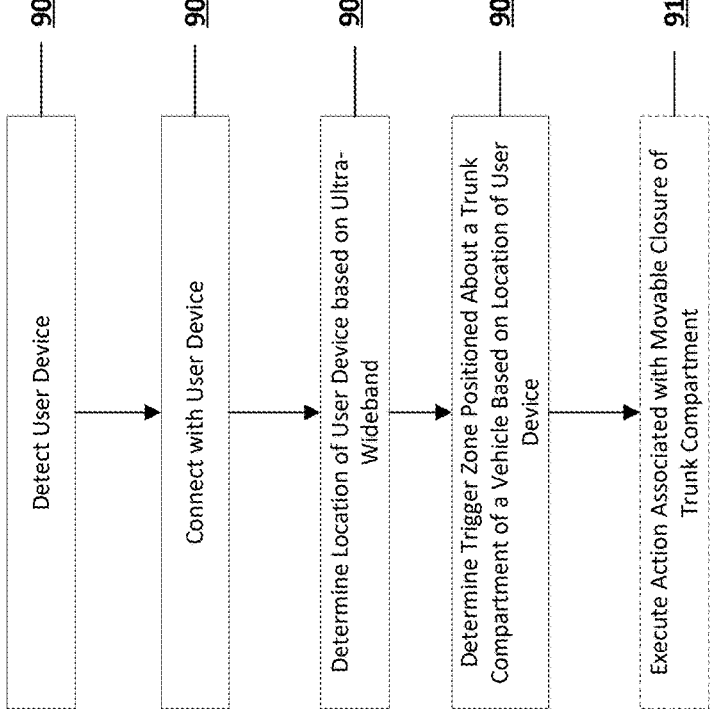
FIG. 9 is a flow diagram illustrating an example embodi-ment of a process for triggering an automated moveable closure action associated with a trunk compartment.

FIG. 9 is a flow diagram illustrating an example embodiment of a process for determining whether to trigger an automated moveable closure action associated with a trunk compartment. Although steps are illustrated in a particular order, steps may be performed multiple times, the order of the steps can be changed, and/or one or more steps can be performed concurrently. Additionally, fewer, more, or different steps can be performed.

At Block 902, the system can perform operations as described herein with reference to Block 802. At Block 904, the system can perform operations as described herein with reference to Block 804. At Block 906, the system can perform operations as described herein with reference to Block 806.

At Block 908, the system may determine that the user device 108 is located within a particular trigger zone positioned about a trunk compartment of the vehicle 100 based on the location of the user device 108 determined at Block 906. For example, the trigger zones may correspond to Zones 702, 704, or 706 described herein with reference to FIG. 7. In some cases, the system may determine that the user device 108 is located outside of a particular trigger zone. In some cases, as described herein, the system may be configured to take a certain action based on whether the user device 108 is inside or outside of one or more trigger zones.

At Block 910, the system may trigger a moveable closure action based on the location of the user device 108 and the associated trigger zone determined at block 908. For example, as described herein with reference to FIG. 7, the system may execute a moveable closure open action. In some cases, as described herein, a trigger zone may be associated with inaction and thus the system may determine to wait for another detection to take an action.

EXAMPLE EMBODIMENTS

Various example embodiments of methods, systems, and non-transitory computer-readable media relating to features described herein can be found in the following clauses:

Clause 1: A system configured for inclusion in a vehicle, the system comprising:

one or more sensors;

one or more processors; and a non-transitory computer-readable medium having stored thereon instructions that, when executed by the one or more processors, cause the one or more processors to:

detect a user device, wherein the user device is authenticated as being associated with the vehicle;

determine a location of the user device using ultra-wideband signals;

determine whether the user device is located within a first trigger zone of a plurality of trigger zones, wherein each trigger zone represents a real-world area positioned about the vehicle; and based on determining that the user device is located within the first trigger zone, executing a first action associated with one or more moveable closures of the vehicle.

Clause 2: The system of clause 1, wherein the instructions, when executed by the one or more processors, further cause the one or more processors to:

calculate the first trigger zone based on an elliptical range corresponding to a circle around a first sensor of the one or more sensors having a radius corresponding to a predetermined distance from the first sensor.

Clause 3: The system of clause 1, wherein the first trigger zone corresponds to an overlap between a first ellipse positioned proximate to the vehicle and a second ellipse positioned proximate to the vehicle, the first ellipse being associated with a first distance from a first of the one or more sensors and the second ellipse being associated with a second distance from a second of the one or more sensors.

Clause 4: The system of clause 1, wherein a first moveable closure of the one or more moveable closures comprises a door.

Clause 5: The system of clause 1, wherein the first action comprises opening a first moveable closure of the one or more moveable closures to a maximum opening angle.

Clause 6: The system of clause 5, wherein the first action comprises opening a first moveable closure of the one or more moveable closures to a percentage of the maximum opening angle, wherein the percentage is greater than 0% and less than 100%.

Clause 7: The system of clause 1, wherein the first action comprises closing a first moveable closure of the one or more moveable closures.

Clause 8: The system of clause 1, wherein the first trigger zone is associated with a zone in which a user associated with the user device is predicted to be leaning into the vehicle, wherein the first action comprises preventing a first moveable closure of the one or more moveable closures from closing, and wherein to determine whether the user device is located within the first trigger zone, the instructions, when executed by the one or more processors, further cause the one or more processors to:

predict, using a neural network, whether the user is leaning into the vehicle, wherein the neural network is trained on training data comprising movement data and sensor data corresponding to a sensor located under a seat of the vehicle.

Clause 9: The system of clause 1, wherein the first action comprises rearming automated door opening functionality of the vehicle.

Clause 10: The system of clause 1, wherein the instructions, when executed by the one or more processors, further cause the one or more processors to:

determine whether the user device is outside of a trigger zone; and based on determining that the user device is located outside of a trigger zone, executing a second action associated with one or more moveable closures of the vehicle.

Clause 11: The system of clause 10, wherein the second action comprises rearming at least one of automated door opening functionality of the vehicle or automated door closing functionality of the vehicle.

Clause 12: The system of clause 1, wherein the first action comprises rearming automated door closing functionality of the vehicle.

Clause 13: The system of clause 1, wherein the instructions, when executed by the one or more processors, further cause the one or more processors to:

determine whether the user device is outside of a second trigger zone; and based on determining that the user device is located within the first trigger zone and outside of the second trigger zone, executing a second action associated with one or more moveable closures of the vehicle.

Clause 14: The system of clause 13, wherein the second action comprises rearming at least one of automated door closing functionality of the vehicle or automated door closing functionality of the vehicle.

Clause 15: A method comprising:

detecting a user device, wherein the user device is authenticated as being associated with a vehicle, the vehicle comprising one or more sensors;

determining a location of the user device using ultra-wideband signals;

determining whether the user device is located within a first trigger zone of a plurality of trigger zones, wherein each trigger zone represents a real-world area positioned about the vehicle; and based on determining that the user device is located within the first trigger zone, executing a first action associated with one or more moveable closures of the vehicle.

Clause 16: The method of clause 15, further comprising:

calculating the first trigger zone based on an elliptical range corresponding to a circle around a first sensor of the one or more sensors having a radius corresponding to a predetermined distance from the first sensor.

Clause 17: The method of clause 15, wherein the first trigger zone corresponds to an overlap between a first ellipse positioned proximate to the vehicle and a second ellipse positioned proximate to the vehicle, the first ellipse being associated with a first distance from a first of the one or more sensors and the second ellipse being associated with a second distance from a second of the one or more sensors.

Clause 18: The method of clause 15, wherein the first action comprises opening a first moveable closure of the one or more moveable closures to a maximum opening angle.

Clause 19: The method of clause 15, wherein the first trigger zone is associated with a zone in which a user associated with the user device is predicted to be leaning into the vehicle, wherein the first action comprises preventing a first moveable closure of the one or more moveable closures from closing, and wherein determining whether the user device is located within the first trigger zone comprises:

predicting, using a neural network, whether the user is leaning into the vehicle, wherein the neural network is trained on training data comprising movement data and sensor data corresponding to a sensor located under a seat of the vehicle.

Clause 20: One or more non-transitory computer-readable media having stored thereon instructions that, when executed by a computing system including one or more processors, cause the computing system to:

detect a user device, wherein the user device is authenticated as being associated with a vehicle;

determine a location of the user device using ultra-wideband signals;

determine whether the user device is located within a first trigger zone of a plurality of trigger zones, wherein each trigger zone represents a real-world area positioned about the vehicle; and based on determining that the user device is located within the first trigger zone, executing a first action associated with one or more moveable closures of the vehicle.

Clause 21: A system configured for inclusion in a vehicle, the system comprising:

one or more sensors;

one or more processors; and a non-transitory computer-readable medium having stored thereon instructions that, when executed by the one or more processors, cause the one or more processors to:

detect a user device, wherein the user device is authenticated as being associated with the vehicle;

determine a location of the user device using ultra-wideband signals;

determine whether the user device is located within a first trigger zone of a plurality of trigger zones, wherein each trigger zone represents a real-world area positioned about a trunk compartment of the vehicle, the trunk compartment comprising a moveable closure; and based on determining that the user device is located within the first trigger zone, executing a first action associated with the moveable closure.

Clause 22: The system of clause 21, wherein the instructions, when executed by the one or more processors, further cause the one or more processors to calculate the first trigger zone based on a plurality of elliptical ranges, wherein a first elliptical range of the plurality of elliptical ranges is calculated based on a first circle around a first sensor of the one or more sensors having a radius corresponding to a predetermined distance from the first sensor, a second elliptical range of the plurality of elliptical ranges is calculated based on a second circle around a second sensor of the one or more sensors having a radius corresponding to a predetermined distance from the second sensor, and a third elliptical range of the plurality of elliptical ranges is calculated based on an ellipse having a center point between the first and second sensors, two predetermined vertex points, a first point located on the first circle, and a second point located on the second circle, and wherein the first trigger zone corresponds to an overlap between the first, second, and third elliptical ranges.

Clause 23: The system of clause 21, wherein the instructions, when executed by the one or more processors, further cause the one or more processors to:

calculate the first trigger zone based on an elliptical range corresponding to a circle around a first sensor of the one or more sensors having a radius corresponding to a predetermined distance from the first sensor.

Clause 24: The system of clause 21, wherein the moveable closure comprises a trunk door.

Clause 25: The system of clause 21, wherein the trunk compartment is located in a rear portion of the vehicle.

Clause 26: The system of clause 21, wherein the trunk compartment is located in a front portion of the vehicle.

Clause 27: The system of clause 21, wherein the first action comprises opening the moveable closure.

Clause 28: The system of clause 21, wherein the first action comprises closing the moveable closure.

Clause 29: The system of clause 21, wherein the first action comprises initiating an opening sequence for the moveable closure, the opening sequence comprising:

causing a light associated with the moveable closure to illuminate; and causing an audio device associated with the moveable closure to emit a sound.

Clause 30: The system of clause 29, wherein the opening sequence comprises a predetermined duration of time.

Clause 31: The system of clause 30, wherein upon conclusion of the predetermined duration of time, the instructions, when executed by the one or more processors, further cause the one or more processors to:

cause the light to turn off;

cause the audio device to stop emitting a sound; and cause the moveable closure to open.

Clause 32: The system of clause 30, wherein based on a determination that the predetermined duration of time has not concluded and that the user device is outside of the first trigger zone, the instructions, when executed by the one or more processors, further cause the one or more processors to:

cause the light to turn off;

cause the audio device to stop emitting a sound; and cause the moveable closure to open.

Clause 33: The system of clause 21, wherein the instructions, when executed by the one or more processors, further cause the one or more processors to:

determine whether the user device is outside of a trigger zone; and based on determining that the user device is located outside of a trigger zone, executing a second action associated with one or more moveable closures of the vehicle, wherein the second action comprises rearming automated door opening functionality of the vehicle.

Clause 34: The system of clause 21, wherein the instructions, when executed by the one or more processors, further cause the one or more processors to:

detect that the moveable closure was closed after the moveable closure was opened;

determine whether a user device has been located within the first trigger zone for a first duration since the moveable closure was closed; and based on a determination that the user device has been located within the first trigger zone for the first duration since the moveable closure was closed, preventing the system from using the location of the user device to determine whether to open the moveable closure.

Clause 35: A method comprising:

detecting a user device, wherein the user device is authenticated as being associated with a vehicle, the vehicle comprising one or more sensors;

determining a location of the user device using ultra-wideband signals;

determining whether the user device is located within a first trigger zone of a plurality of trigger zones, wherein each trigger zone represents a real-world area positioned about a trunk compartment of the vehicle, the trunk compartment comprising a moveable closure; and based on determining that the user device is located within the first trigger zone, executing a first action associated with the moveable closure.

Clause 36: The method of clause 35, further comprising calculating the first trigger zone based on a plurality of elliptical ranges, wherein a first elliptical range of the plurality of elliptical ranges is calculated based on a first circle around a first sensor of the one or more sensors having a radius corresponding to a predetermined distance from the first sensor, a second elliptical range of the plurality of elliptical ranges is calculated based on a second circle around a second sensor of the one or more sensors having a radius corresponding to a predetermined distance from the second sensor, and a third elliptical range of the plurality of elliptical ranges is calculated based on an ellipse having a center point between the first and second sensors, two predetermined vertex points, a first point located on the first circle, and a second point located on the second circle, and wherein the first trigger zone corresponds to an overlap between the first, second, and third elliptical ranges.

Clause 37: The method of clause 35, further comprising calculating the first trigger zone based on an elliptical range corresponding to a circle around a first sensor of the one or more sensors having a radius corresponding to a predetermined distance from the first sensor.

Clause 38: The method of clause 35, wherein the first action comprises initiating an opening sequence for the moveable closure, the opening sequence comprising:

causing a light associated with the moveable closure to illuminate; and causing an audio device associated with the moveable closure to emit a sound.

Clause 39: The method of clause 35, further comprising:

determining whether the user device is outside of a trigger zone; and based on determining that the user device is located outside of a trigger zone, executing a second action associated with one or more moveable closures of the vehicle, wherein the second action comprises rearming automated door opening functionality of the vehicle.

Clause 40: One or more non-transitory computer-readable media having stored thereon instructions that, when executed by a computing system including one or more processors, cause the computing system to:

detect a user device, wherein the user device is authenticated as being associated with a vehicle;

determine a location of the user device using ultra-wideband signals;

determine whether the user device is located within a first trigger zone of a plurality of trigger zones, wherein each trigger zone represents a real-world area positioned about a trunk compartment of the vehicle, the trunk compartment comprising a moveable closure; and based on determining that the user device is located within the first trigger zone, executing a first action associated with the moveable closure.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system configured for inclusion in a vehicle, the system comprising:
  one or more sensors;
  one or more processors; and
  a non-transitory computer-readable medium having stored thereon instructions that, when executed by the one or more processors, cause the one or more processors to:
  detect a user device, wherein the user device is authenticated as being associated with the vehicle;
  determine a location of the user device using ultra-wideband signals;
  determine whether the user device is located within a first trigger zone of a plurality of trigger zones, wherein each trigger zone represents a real-world area positioned about a trunk compartment of the vehicle, the trunk compartment comprising a moveable closure; and
  based on determining that the user device is located within the first trigger zone, executing a first action associated with the moveable closure,
  wherein the first action comprises initiating an opening sequence for the moveable closure, and wherein the one or more processors are configured to prevent a false open associated with the opening sequence based on a speed associated with the user device.

2. The system of claim 1, wherein the instructions, when executed by the one or more processors, further cause the one or more processors to calculate the first trigger zone based on a plurality of elliptical ranges, wherein
  a first elliptical range of the plurality of elliptical ranges is calculated based on a first circle around a first sensor of the one or more sensors having a radius corresponding to a predetermined distance from the first sensor,
  a second elliptical range of the plurality of elliptical ranges is calculated based on a second circle around a second sensor of the one or more sensors having a radius corresponding to a predetermined distance from the second sensor, and
  a third elliptical range of the plurality of elliptical ranges is calculated based on an ellipse having a center point between the first and second sensors, two predetermined vertex points, a first point located on the first circle, and a second point located on the second circle, and
  wherein the first trigger zone corresponds to an overlap between the first, second, and third elliptical ranges.

3. The system of claim 1, wherein the instructions, when executed by the one or more processors, further cause the one or more processors to:
  calculate the first trigger zone based on an elliptical range corresponding to a circle around a first sensor of the one or more sensors having a radius corresponding to a predetermined distance from the first sensor.

4. The system of claim 1, wherein the moveable closure comprises a trunk door.

5. The system of claim 1, wherein the trunk compartment is located in a rear portion of the vehicle.

6. The system of claim 1, wherein the trunk compartment is located in a front portion of the vehicle.

7. The system of claim 1, wherein the first action further comprises opening the moveable closure.

8. The system of claim 1, wherein the first action further comprises closing the moveable closure.

9. The system of claim 1, wherein the opening sequence comprising:
  causing a light associated with the moveable closure to illuminate; and
  causing an audio device associated with the moveable closure to emit a sound.

10. The system of claim 9, wherein the opening sequence comprises a predetermined duration of time.

11. The system of claim 10, wherein upon conclusion of the predetermined duration of time, the instructions, when executed by the one or more processors, further cause the one or more processors to:
  cause the light to turn off;
  cause the audio device to stop emitting a sound; and
  cause the moveable closure to open.

12. The system of claim 10, wherein based on a determination that the predetermined duration of time has not concluded and that the user device is outside of the first trigger zone, the instructions, when executed by the one or more processors, further cause the one or more processors to:
  cause the light to turn off;
  cause the audio device to stop emitting a sound; and
  cause the moveable closure to open.

13. The system of claim 1, wherein the instructions, when executed by the one or more processors, further cause the one or more processors to:
  determine whether the user device is outside of a trigger zone; and
  based on determining that the user device is located outside of a trigger zone, executing a second action associated with one or more moveable closures of the vehicle,
  wherein the second action comprises rearming automated door opening functionality of the vehicle.

14. The system of claim 1, wherein the instructions, when executed by the one or more processors, further cause the one or more processors to:
  detect that the moveable closure was closed after the moveable closure was opened;
  determine whether a user device has been located within the first trigger zone for a first duration since the moveable closure was closed; and
  based on a determination that the user device has been located within the first trigger zone for the first duration since the moveable closure was closed, preventing the system from using the location of the user device to determine whether to open the moveable closure.

15. A method comprising:

detecting a user device, wherein the user device is authenticated as being associated with a vehicle, the vehicle comprising one or more sensors;

determining a location of the user device using ultra-wideband signals;

determining whether the user device is located within a first trigger zone of a plurality of trigger zones, wherein each trigger zone represents a real-world area positioned about a trunk compartment of the vehicle, the trunk compartment comprising a moveable closure; and based on determining that the user device is located within the first trigger zone, executing a first action associated with the moveable closure, wherein the first action comprises initiating an opening sequence for the moveable closure, and wherein the method further comprises preventing a false open associated with the opening sequence based on a speed associated with the user device.

16. The method of claim 15, further comprising calculating the first trigger zone based on a plurality of elliptical ranges, wherein a first elliptical range of the plurality of elliptical ranges is calculated based on a first circle around a first sensor of the one or more sensors having a radius corresponding to a predetermined distance from the first sensor, a second elliptical range of the plurality of elliptical ranges is calculated based on a second circle around a second sensor of the one or more sensors having a radius corresponding to a predetermined distance from the second sensor, and a third elliptical range of the plurality of elliptical ranges is calculated based on an ellipse having a center point between the first and second sensors, two predetermined vertex points, a first point located on the first circle, and a second point located on the second circle, and wherein the first trigger zone corresponds to an overlap between the first, second, and third elliptical ranges.

17. The method of claim 15, further comprising calculating the first trigger zone based on an elliptical range corresponding to a circle around a first sensor of the one or more sensors having a radius corresponding to a predetermined distance from the first sensor.

18. The method of claim 15, wherein the opening sequence comprising:

causing a light associated with the moveable closure to illuminate; and causing an audio device associated with the moveable closure to emit a sound.

19. The method of claim 15, further comprising:

determining whether the user device is outside of a trigger zone; and based on determining that the user device is located outside of a trigger zone, executing a second action associated with one or more moveable closures of the vehicle, wherein the second action comprises rearming automated door opening functionality of the vehicle.

20. One or more non-transitory computer-readable media having stored thereon instructions that, when executed by a computing system including one or more processors, cause the computing system to:

detect a user device, wherein the user device is authenticated as being associated with a vehicle;

determine a location of the user device using ultra-wideband signals;

determine whether the user device is located within a first trigger zone of a plurality of trigger zones, wherein each trigger zone represents a real-world area positioned about a trunk compartment of the vehicle, the trunk compartment comprising a moveable closure; and based on determining that the user device is located within the first trigger zone, executing a first action associated with the moveable closure, wherein the first action comprises initiating an opening sequence for the moveable closure, and wherein the computing system is further configured to prevent a false open associated with the opening sequence based on a speed associated with the user device.

* * * * *